US008842261B2

(12) United States Patent
Frucht

(10) Patent No.: US 8,842,261 B2
(45) Date of Patent: Sep. 23, 2014

(54) LASER RANGE FINDER AND METHOD FOR INTRUSION DETECTION

(75) Inventor: Yaacov Frucht, Akko (IL)

(73) Assignee: Frucht Systems, Technologies and Business Development, Akko (IL)

( * ) Notice: Subject to any disclaimer, the term of this patent is extended or adjusted under 35 U.S.C. 154(b) by 349 days.

(21) Appl. No.: 13/345,937

(22) Filed: Jan. 9, 2012

(65) Prior Publication Data

US 2012/0176593 A1    Jul. 12, 2012

(30) Foreign Application Priority Data

Jan. 10, 2011  (IL) .......................................... 210532

(51) Int. Cl.
*G01C 3/08* (2006.01)
*G01S 17/88* (2006.01)
*G01S 17/42* (2006.01)
*G01S 7/486* (2006.01)
*G08B 13/183* (2006.01)
*G01S 17/10* (2006.01)
*G01S 7/481* (2006.01)

(52) U.S. Cl.
CPC ................ *G08B 13/183* (2013.01); *G01S 17/88* (2013.01); *G01S 17/42* (2013.01); *G01S 7/4813* (2013.01); *G01S 7/4865* (2013.01); *G01S 17/10* (2013.01)
USPC .......... 356/4.01; 356/3.01; 356/4.1; 356/5.01

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| 6,188,319 | B1 | 2/2001 | Frucht |
| 6,212,480 | B1 * | 4/2001 | Dunne .......................... 702/159 |
| 6,842,231 | B2 | 1/2005 | Nourrcier et al. |
| 2008/0278715 | A1 | 11/2008 | Swenson et al. |
| 2009/0091446 | A1 | 4/2009 | Jang et al. |

* cited by examiner

*Primary Examiner* — Luke Ratcliffe
(74) *Attorney, Agent, or Firm* — Holtz Holtz Goodman & Chick PC

(57) ABSTRACT

A scanning beam laser range finder and a method are provided for detecting an intrusion into a protected area by enhancing the capability of detecting an intruded attempting to blend with the area background. The laser range finder and method include an Emitter/Receiver configured to emit laser pulses towards each point out of the plurality of points and to receive therefrom reflected laser pulses. Further included is a processor coupled to the Emitter/Receiver and configured to derive an initial distance separating the laser range finder away from each point, the initial distance having an initial measurement error. At least one amplitude comparator is coupled to the Emitter/Receiver and to the processor, which is configured to derive a corrected distance to each point, the corrected distance having a corrected measurement error smaller than the initial measurement error.

6 Claims, 8 Drawing Sheets

LASER RANGE FINDER AND METHOD FOR INTRUSION DETECTION

TECHNICAL FIELD

Embodiments of the present invention relate to a scanning beam laser range finder and a method for detecting an intruder attempting to penetrate into a protected area.

BACKGROUND ART

In view of threats posed by criminals and terrorists, there is an ever-increasing need for systems aiming to detect the presence of intruders in protected areas.

U.S. Pat. No. 6,188,319 discloses a system for detecting the presence of an intruder in a protected area. A light beam is reflected from a target, which is a potential intruder. The system analyzes the measurements of distance and intensity of the reflected light. The algorithm for detecting the presence of an intruder is based on changes in the measured distance and/or intensity of reflected light, when compared to measurements performed during a previous background "learning" period of the area to be protected. The system utilizes a simple pulse detector in the laser range finder, but an intruder may attempt to defeat the system by moving in proximity of a background obstacle, by crawling on the ground or by walking close to a wall.

U.S. Pat. No. 6,842,231 to Nourrcier et al. discloses a laser range finder method using an Analog-to-Digital converter for sampling a portion of the reflected laser pulse. The complete shape and implicitly the center of the reflected pulse are being inferred by applying a delay function, calculating the slope of the reflected pulse once it crosses a threshold level and deducing the shape of the pulse by accessing a look-up table.

A scanning laser radar with adjustable operational parameters is disclosed by US Patent Application 2008/0278715 to Swenson et al. US Patent Application 2009/0091446 to Jang et al. reveals a security system using a laser range finder and a method for detecting an intruder by using a laser range finder.

The patents listed hereinabove seem not reveals systems or methods that detect an intruder which is very close to a background, and seem not perform repeated adjustments to an initial estimated distance up to a suspected point of intrusion, so as to decrease a likelihood of false alarm and increase precision of distance estimation.

Technical Problem

The problem relates to the ability of a scanning beam laser range finder to detect an intruder attempting to penetrate into a restricted area. An intruder may show up as a target, or as a new feature in comparison to a previous scan of the laser range finder. However, the intruder may try to defeat detection by attempting to mix or blend with an element present in the area or with the area background. For example, the intruder may crawl on the ground or progress while leaning against a wall, in which cases the laser range finder will find it difficult if not impossible to differentiate between the distance to the two targets, namely to the element present in the area, such as the wall, and to the intruder.

Solution to Problem

To overcome the difficulty of detecting the intruder, there are provided a method and a scanning beam laser range finder having at least one amplitude comparator operative in association with at least one predetermined amplitude level threshold. It is noted that the at least one amplitude comparator may be disposed in addition to a detection threshold DT selected to exceed the overall noise level of the laser range finder. The at least one amplitude comparator and the at least one predetermined amplitude level threshold are configured to operate on laser pulses reflected back from points in the area. The operation of an amplitude comparator in association with an amplitude level threshold permits to introduce a time correction term, which is applied to correct and reduce distance measurement errors, whereby it becomes possible to distinguish between targets disposed in close mutual proximity, e.g. an intruder and an element of the area such as a wall for example.

Advantageous Effects of Invention

It would be advantageous to combat the strategy of an intruder who may move close to an element of the area under surveillance, by sending laser pulses to the area and by receiving and analyzing laser pulses reflected therefrom. The laser range finder may derive an initial distance, which may be associated with an initial distance error, or time, measurement error, separating the laser range finder from a point of intrusion. The use of at least one amplitude comparator associated with at least one correction term, may enhance the precision of the distance measurement relative to closely disposed targets, and derive a corrected distance permitting to distinguish an intruder out of the are background, and of the point of intrusion.

It is an object of the embodiments of the present invention to provide a laser range finder, or a retrofitted laser range finder, and a method for the detection of an intrusion into a protected area under surveillance, such as an airport for example. There is provided a method and a laser range finder (LRF) configured for scanning a plurality of points (p) of a scanned area (25) under surveillance, to detect an intrusion into the area. The laser range finder may comprise an Emitter/Receiver (1) configured to emit laser pulses towards each point out of the plurality of points in the area, and to receive therefrom reflected laser pulses. The laser range finder may further comprise a processor (3) coupled to the Emitter/Receiver and configured to derive an initial distance ($d_{init}$) separating the laser range finder away from each point, the initial distance having an initial measurement error ($\epsilon_{init}$). Furthermore, at least one amplitude comparator (AC1) may be coupled to the Emitter/Receiver and to the processor, which is configured to derive a corrected distance ($d_{corr}$) to each point, the corrected distance having a corrected measurement error ($\epsilon_{corr}$) smaller than the initial measurement error.

It is another object of the present invention to provide an at least one amplitude comparator (AC 1) that is configured to compare an amplitude of the reflected laser pulse to at least one corresponding amplitude level (AL1), where the processor (3) is configured to selectively apply at least one time correction term (C1) to the reflected laser pulse.

It is a further object of the present invention to provide a laser range finder, or a retrofitted laser range finder, which includes a plurality of amplitude comparators (ACi) such as four amplitude comparators (AC1 to AC4) that are configured to compare the amplitude of the reflected laser pulse to, respectively, a plurality of amplitude levels (ALi), or four amplitude levels (AL1 to AL4) in the present example. The processor (3) may be configured to selectively apply at least one, or a plurality of correction terms (Ci), or one out of four time correction terms, respectively (C1 to C4), to the reflected laser pulse.

It is yet an object of the present invention to provide the ability of the scanned area to be divided into a plurality of annuli (ANNi), or to a portion of one or more annuli, and to have at least one amplitude comparator (AC1i) that is associated with one annulus out of the plurality of annuli. The at least one amplitude comparator is configured to compare the amplitude of the reflected laser pulse to at least one respectively corresponding amplitude level (AL1i), and the processor (3) is configured to selectively apply at least one respectively corresponding time correction term (C1i) to the reflected laser pulse.

It is still an object of the present invention to provide the ability to divide the scanned area into a plurality of annuli, and for each annulus out of the plurality of annuli, to provide four amplitude comparators (AC1 to AC4) that are configured to compare the amplitude of the reflected laser pulse to, respectively, four corresponding amplitude levels (AL1 to AL4), where the processor (3) is configured to selectively apply at least one out of four corresponding time correction terms, respectively (C1 to C4)), to the reflected laser pulse.

It is one object of the present invention to provide a laser range finder that is housed in a housing (7) having a housing interior (IN) and a housing exterior (EX), and where the at least one amplitude comparator (AC1) is disposed in one of the housing interior and the housing exterior.

It is yet one object of the present invention to provide a method for detecting an intrusion into a scanned area (25), where the method may comprises the following steps:

Emitting laser pulses from a laser range finder (LRF) towards a plurality of points (p) in the area, Receiving a reflected laser pulse from each point out of the plurality of points, Deriving an initial distance ($d_{init}$) separating away the laser range finder from each point, where the derived initial distance has an initial measurement error ($\epsilon_{init}$).

Applying selectively at least one time correction term (C1) to the reflected pulses, and Deriving for each point a corrected distance ($d_{corr}$), which has a measurement error ($\epsilon_{corr}$), which is smaller than the initial measurement error.

It is yet one more object of the present invention to provide a method where at least one amplitude comparator (AC1) is used to compare an amplitude of the reflected pulse to at least one corresponding amplitude level (AL1), and to apply selectively at least one time correction term (C1) to the reflected laser pulse.

It is still one object of the present invention to provide a method operating four amplitude comparator (AC1 to AC4) to compare the amplitude of the reflected laser pulse to, respectively, four corresponding amplitude levels (AL1 to AL4), and to apply selectively four corresponding time correction terms, respectively (C1 to C4), to the reflected laser pulse.

It is still one more object of the present invention to provide a method permitting to divide the scanned area into a plurality of annuli (ANNi), and to provide a different at least one time correction term (Ci) for each annulus out of the plurality of annuli. It is further possible to apply selectively the at least one time correction term (C1i) to the pulses reflected from each respectively corresponding annulus.

It is an additional object of the present invention to provide a laser range finder (LRF) configured for scanning an area (25) to detect if an intruder has penetrated therein, and for deriving an initial distance ($d_{init}$) to the intruder. The laser range finder may comprise an Emitter/Receiver (1) configured to emit laser pulses towards the area and to receive therefrom reflected laser pulses, and at least one amplitude comparator (AC1) coupled to the Emitter/Receiver (1) and configured to compare an amplitude of the reflected laser pulse to at least one amplitude level (AL1). The laser range finder may further comprise a processor (3) coupled to both the Emitter/Receiver and the at least one amplitude comparator, and configured to selectively apply at least one time correction term (C1) to the reflected laser pulses.

It is a further additional object of the present invention to provide a laser range finder where the laser pulses are reflected by a plurality of points (p) in the scanned area, and where the processor is configured to derive an initial distance separating the laser range finder away from each point out of the plurality of points, the initial distance having an initial measurement error ($\epsilon_{init}$) and a corrected distance ($d_{corr}$) to each point, the corrected distance having a corrected measurement error ($\epsilon_{corr}$) smaller than the initial measurement error.

It is still further an additional object of the present invention to provide a method for using a laser range finder (LRF) for scanning an area (25) to detect if an intruder has penetrated therein, and for deriving an initial distance ($d_{init}$) to the intruder. The method may comprise the steps of:

Deriving an initial measurement error ($\epsilon_{init}$) associated with the initial distance.

Providing at least one amplitude level threshold (AL1).

Running at least one computer program (CP) loaded with at least one time correction term (C1) associated with the at least one amplitude level threshold, and Deriving a corrected distance ($d_{corr}$) having a corrected measurement error ($\epsilon_{corr}$) which is smaller than the initial distance measurement error ($\epsilon_{init}$).

BRIEF DESCRIPTION OF DRAWINGS

Embodiments are described, by way of non-limiting examples only, with reference to the accompanying drawings, in which.

DESCRIPTION OF EMBODIMENTS

Figure 1:
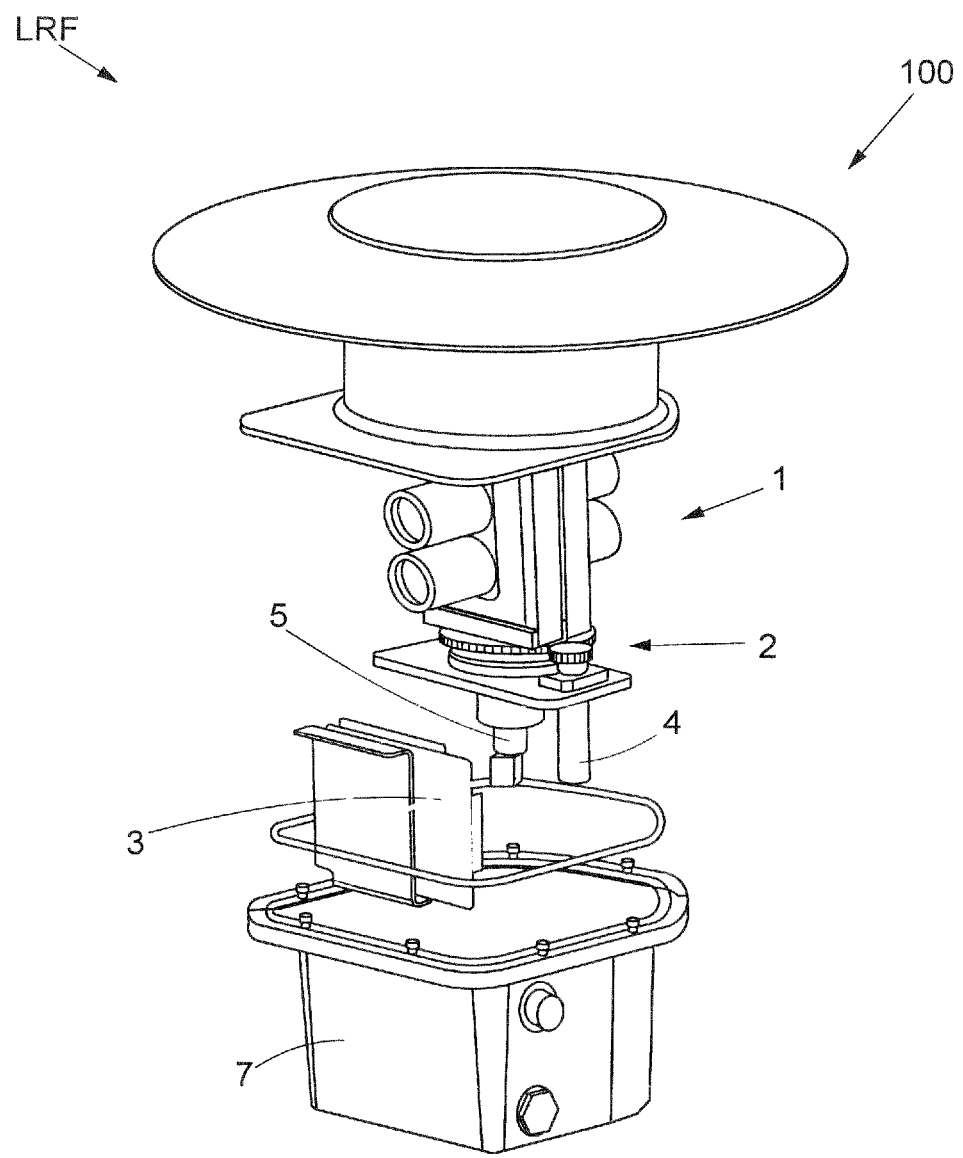
FIG. 1 is an exploded view of an embodiment of a laser range finder.

FIG. 1 is an exploded view of an embodiment 100 of a scanning beam laser range finder LRF configured for surveillance of a scanned area 25, or area 25 for short. The scanning laser range finder LRF has an Emitter/Receiver 1 and a processor 3. The Emitter/Receiver 1 is configured with the ability to emit and receive laser pulses, or pulses for short. In the embodiment 100, a scanning, mechanism may be implemented as a motor 4 coupled to a reduction gear 5 to rotate the Emitter/Receiver 1. An angular encoder 5 may be coupled to an output of the reduction gear 5 to derive angles at which the Emitter/Receiver 1 emits pulses. The derived angles are communicated to the processor 3.

Figure 2:
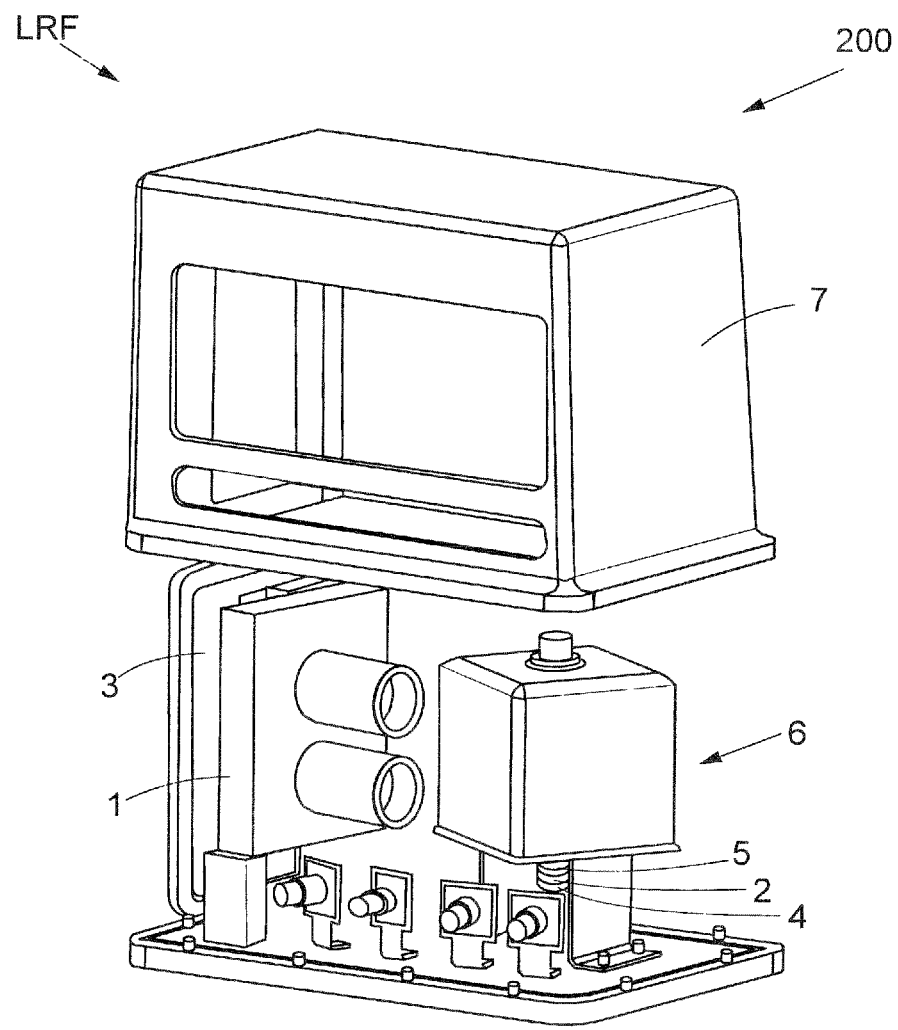
FIG. 2 is an exploded view of another embodiment of a laser range finder.

FIG. 2 depicts an exploded view of an alternative embodiment 200, where the laser range finder is stationary, and a rotating mirror block 6 receives pulses emitted by the Emitter/Receiver 1 and reflects the received pulses towards an area 25. The mirror block 6 receives returned pulses reflected from the area 25 and redirects the reflected pulses back towards the Emitter/Receiver 1. A scanning mechanism may be implemented as a motor 4 coupled to a reduction gear 5 to rotate the mirror block 6. An angular encoder 5 may be coupled to an output of the reduction gear 5 to derive angles at which the Emitter/Receiver 1 emits pulses.

The embodiments 100, 200 of the laser range finder ERE may be configured to have a housing 7 having a housing interior IN and a housing exterior EX. The embodiments 100, 200 emit laser pulses towards and receive back reflected laser pulses from intruders and/or targets, including elements or items of the area 25, such as e.g., ails, bushes, trees, hills, or plain ground. The total angle scanned by the embodiments 100, 200 may reach up to 360°. N individual points p of the area 25 may be scanned. N may be 6,000 for example, and an angular separation among the points p may be 216 arc seconds. Scanning of the area 25 may be performed with a frequency v and, for each point p located at an angular position α, distance statistics, e.g., average distance readings $d_{avr}$, are accumulated by the processor 3 in a memory M and continuously updated therein.

It is known to those skilled in the art that a time-of-flight τ is used to determine a distance d between a target and the laser range finder LRF. Ideally, the distance d may be calculated as one-half the product between the speed of light, $c=3\cdot10^8$ m/s, and the time-of-flight τ: $d=\frac{1}{2}\cdot c\cdot\tau$ Equation (1)

Ideally, the emitted and reflected laser pulses have no width. In practice however, the emitted and reflected pulses do have a width, as plotted in FIG. 4, and a time interval between the emitted and reflected pulses is subject to errors. Pulse width, as it is known, is due to factors including, but not limited to, electronic noise or environmental conditions, like temperature and visibility or target reflectivity. Such factors combine in an overall noise level that causes time and distance measurement errors.

Figure 3:
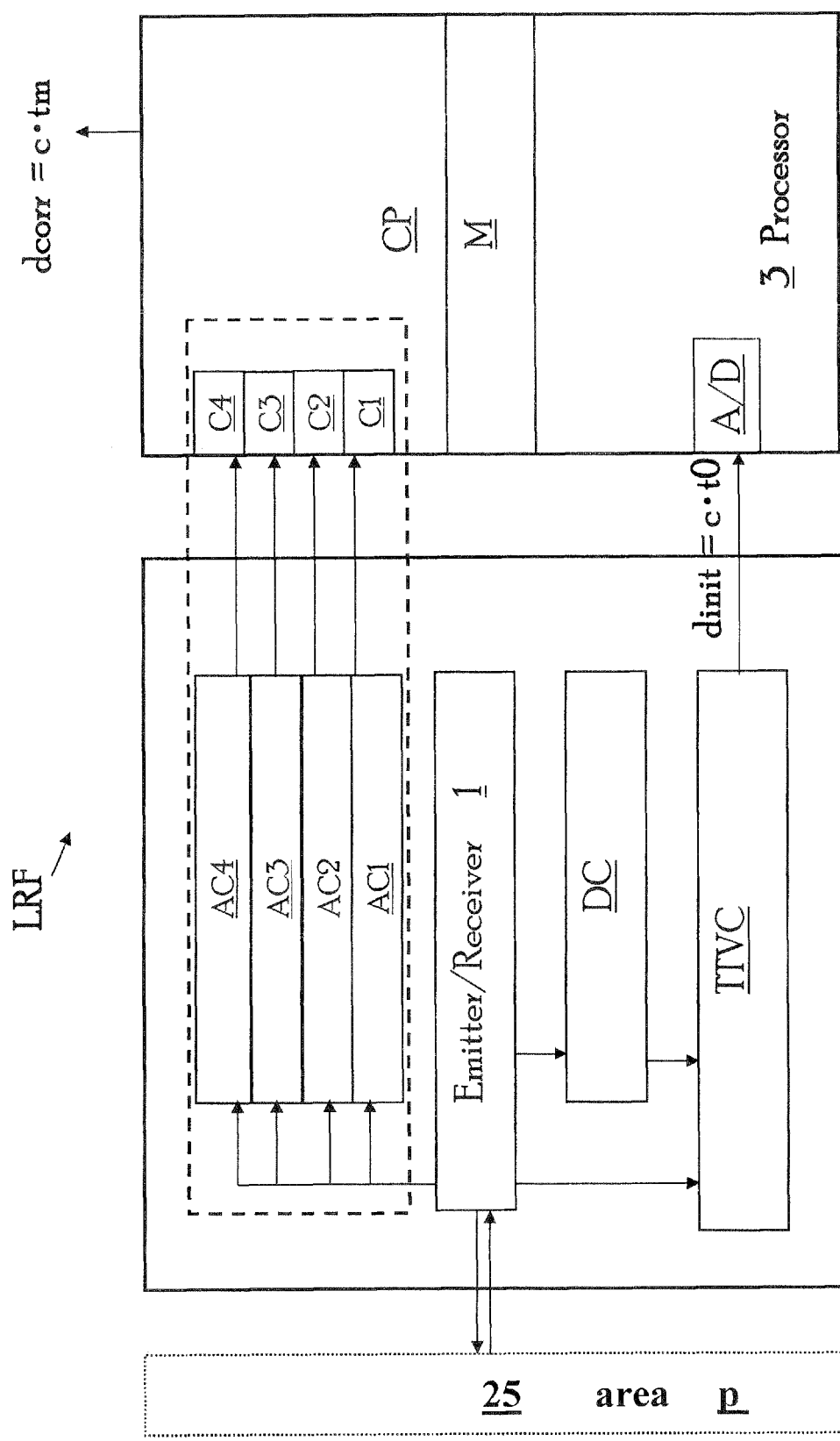
FIG. 3 is a block diagram illustrating a preferred embodiment including four amplitude comparators in addition to a basic detection comparator.

A block diagram of the embodiments 100, 200 of the laser range finder LRF is illustrated in FIG. 3. The laser range finder LRF comprises the Emitter/Receiver 1, the processor 3, a detection comparator DC, and a time-to-voltage converter TTVC, disposed in mutual functional communication. Evidently, not all received reflected pulses are significant. A decision on whether to consider or ignore a reflected pulse may be taken by the detection comparator DC associated with a detection threshold DT. The decision may be based on whether the amplitude of the reflected pulse reaches at least the detection threshold DT, which is preferably selected to exceed the overall noise level, referred to hereinabove.

To measure an initial distance $d_{init}$ to a point p, the time-to-voltage converter TTVC is triggered by a signal received from the Emitter/Receiver 1, which signal is simultaneous with the emission of a pulse towards the point p. The point p may be considered as being a target. In conjunction with the emitted pulse, the processor 3 compares the amplitude of the pulse returned from the area 25 to the detection threshold DT. If the amplitude of the reflected pulse does not reach the detection threshold DT, then the reflected pulse is discarded or ignored. However, when the reflected pulse is not ignored, then the difference between the time of pulse emission and the time t at which the amplitude of the reflected laser pulse reaches the Emitter/Receiver 1 is considered as being the time-of flight τ.

As shown in FIG. 3, the Emitter/Receiver 1 communicates the time-of-emission of a laser pulse directly to the time-to-voltage converter TTVC. In parallel thereto, the time at which the amplitude of the reflected pulse reaches the detection threshold DT is provided to the time-to-voltage converter TTVC by the detection comparator DC.

The time-to-voltage converter TTVC provides a voltage proportional to the time-of-flight τ. The processor 3 derives an initial distance $d_{init}$ to the point p, by virtue of the time—distance Equation (1). The overall noise level referred to hereinabove causes a measurement of the initial distance $d_{init}$ to be affected by an initial measurement error $\epsilon_{init}$.

In addition to the detection comparator DC, the laser range finder LRF may be provided with a plurality of amplitude comparators ACi, where i is a positive integer. For example, for i=4, four amplitude comparators ranging from AC1 to AC4, shown framed within dotted lines in FIG. 3. The amplitude comparators, AC1 to AC4 may be disposed in the housing interior IN or in the housing exterior EX. Alternatively, an existing laser range finder LRF may be retrofitted or upgraded to include one or more amplitude comparators, such as for example, four amplitude comparators AC1 to AC4.

The amplitude comparators AC1 to AC4 are coupled in communication with the processor 3 which may hold in memory corresponding predetermined, calibrated amplitude level thresholds, respectively, AL1 to AL4.

Figure 5:
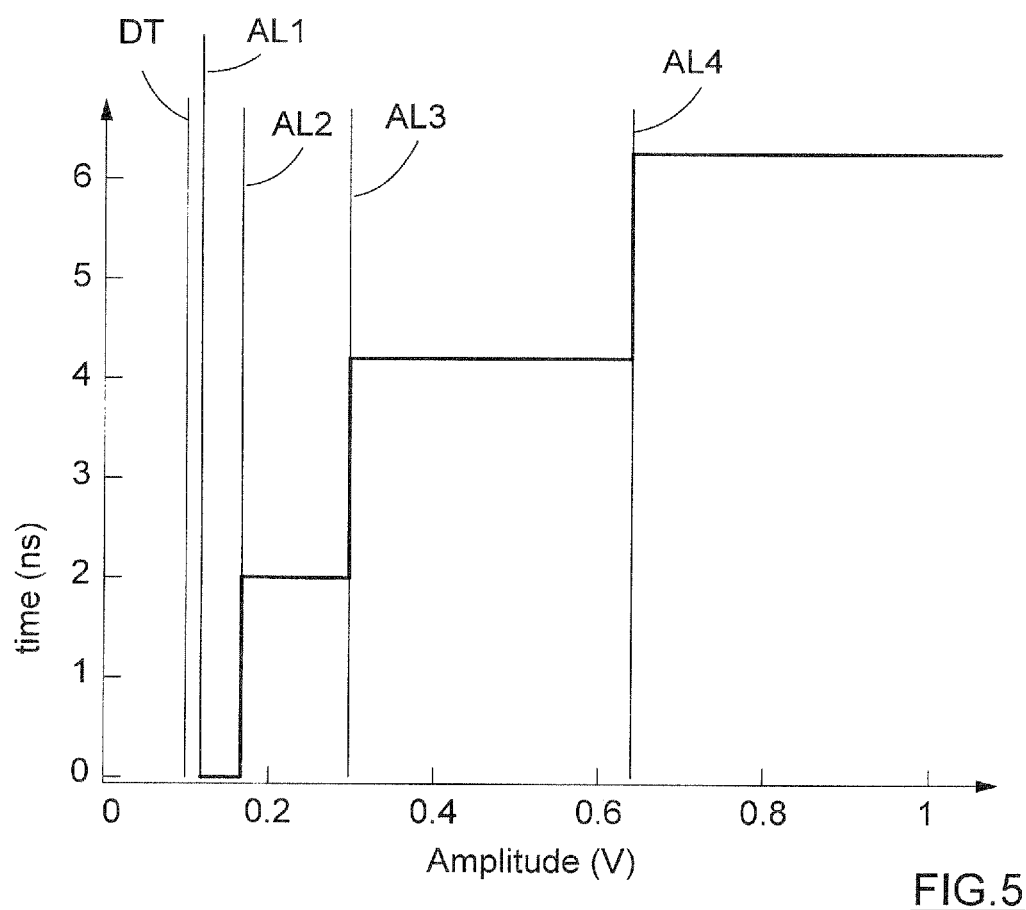
FIG. 5 is a plot of time corrections applied to a simulated reflected pulse crossing the four amplitude level thresholds, FIG. 6 compares the error committed in two typical example cases: the first, when just a detection comparator is being used and no time correction terms are being applied, versus the second, when, in addition to the detection comparator, four amplitude comparators are being used and suitable, associated time correction terms are being applied.

The amplitude thresholds of the four amplitude threshold levels AL1 to AL4 may better be higher than the amplitude threshold of the detection threshold DT. Furthermore, the amplitude threshold of the four amplitude threshold levels AL1 to AL4 may be selected in successive order of growth. In other words, the threshold set by the first amplitude threshold level AL1 may be higher than that of the detection threshold DT, and the threshold of the second amplitude threshold level AL2 may be higher than that of the first amplitude threshold level AL1. Likewise, the third amplitude threshold level AL3 may have a threshold level that is higher than that of the second amplitude threshold level AL2, and so forth in growing succession for the third and fourth amplitude threshold levels, respectively AL3 and AL4. For example, as shown in FIG. 5, the detection threshold DT may be 0.1V, the first amplitude threshold level AL1 may be 0.11V, the second amplitude threshold level AL2 may be 0.17V, the third amplitude threshold level AL3 may be 0.3 V, and the fourth amplitude threshold level AL4 may be 0.64V.

Each time the amplitude of a reflected pulse equal or exceeds one of the amplitude threshold levels AL1 to AL4, a corresponding time correction term, C1 to C4 respectively, may be applied, whereby the reflected pulse is shifted back in time. The shift in time causes the processor 3 to derive a corrected distance $d_{corr}$ to a point p. The corrected distance $d_{corr}$ is derived in association with a corrected measurement error $\epsilon_{corr}$, which is smaller than the initial measurement error $\epsilon_{init}$. Evidently, the angle α to the target is derived simultaneously.

The processor 3, including an analog-to-digital converter A/D and a memory M, is operationally connected to components of the laser range finder LRF and executes at least one computer program CP hosted in the memory M. The memory M that is coupled to the processor 3, is a computer-readable medium, which is encoded with instructions and at least with the at least one computer program CP. The at least one computer program CP is configured to provide control of the operation of the laser range finder LRF and to perform computations including physical measurements. Such computations may include for example, time of flight τ, distance to target d, and angle α to the target, as well as signal processing, including time shifts to and corrections of the reflected pulses.

It is noted that some elements of the laser range finder LRF have been deleted from FIG. 3 for the sake of clarity. Elements well known to persons skilled in the art are not referred to, such as for example, power supply for operation of the laser range finder LRF, input/output means, and/or a transceiver for communication of data and alarm to a remote station and for remote control and operation of the laser range finder.

Figure 4:
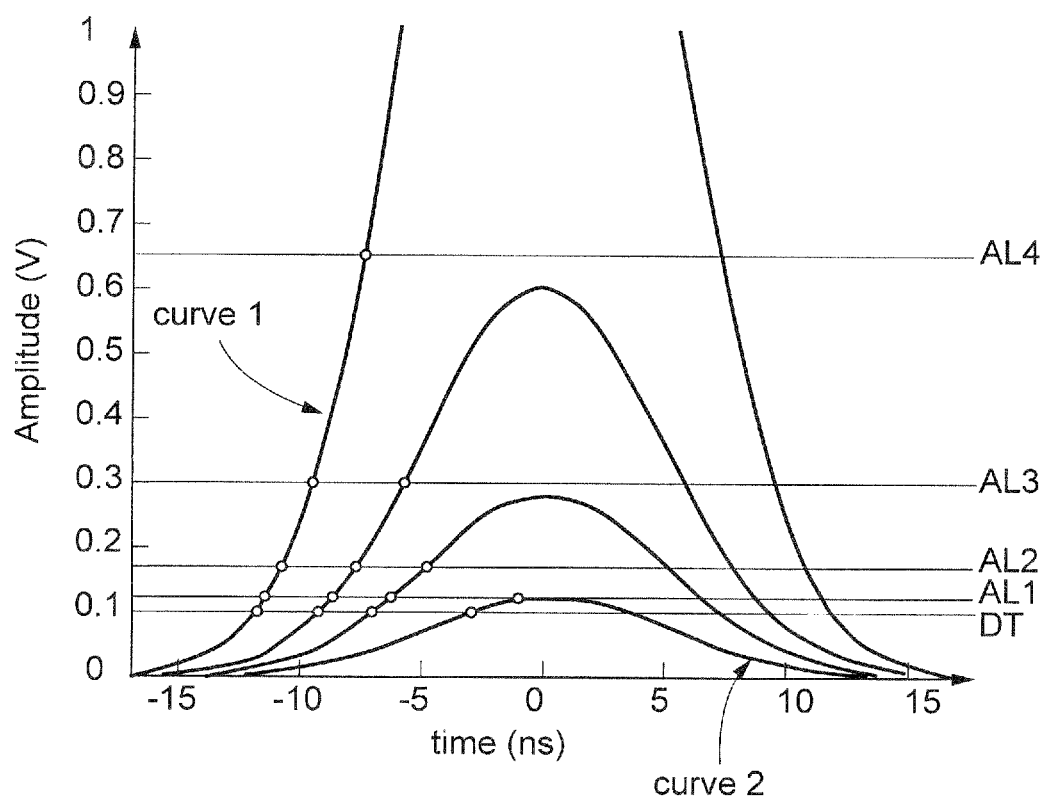
FIG. 4 is a plot of examples of reflected pulses being compared to a basic detection threshold and subsequently to four additional amplitude level thresholds.

FIG. 4 shows examples of reflected pulse signals, which after crossing the detection threshold DT, continue to rise quite abruptly, as shown by curve 1, in case of highly reflective targets. Alternatively, reflected pulses may taper off after crossing the detection threshold DT, as shown by curve 2 in FIG. 4, in case of targets that are not well defined or not easily distinguishable from the surrounding background.

Figure 8:
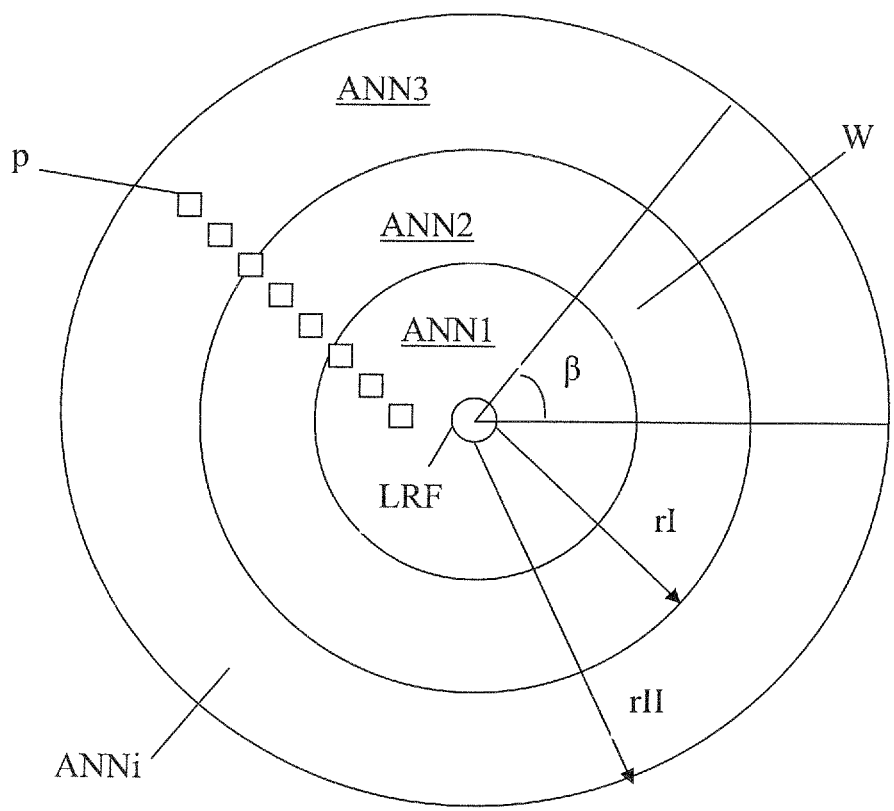
FIG. 8 shows a scanned area divided into annuli.

Embodiments may comprise not just one set of time correction terms C1 to C4, but a plurality of sets of time correction terms. By way of example, for a circular scan area of radius r equal to, say 100 m, the area may be divided into annuli ANNi. Annuli ANNi may be limited by a lower radius rI and a larger radius rII, as shown in FIG. 8. Such radius limits for annuli ANNi with i=3, may range for example, from 0 to 10 m for annulus ANN1, from 10 to 60 m for annulus ANNi2, and from 60 to 100 m for annulus ANN3, where the index i is a positive integer. For each one annulus ANNi and following suitable calibration, a corresponding set of time correction terms C1 to C4 may be provided. It is noted that the laser range finder LRF may scan only a portion W of an annulus delimited by an angle β, as shown in FIG. 8, covering less than 360°, which portion is nevertheless referred to as an annulus for the ease of description.

In the example depicted in FIG. 4, where abscissa and ordinate are respectively, time in nanoseconds (ns) and pulse amplitude in volts (V) the curve 1 crosses the detection threshold DT at about −12 ns, as indicated by the leftmost square dot. The value of −12 ns would falsely place the target 1.8 m closer to the laser range finder LRF, in front of the target's actual location. To correct then, reflected pulses breaking through one or more amplitude threshold levels AL1 to AL4 need to be "pushed back" by way of time correction(s).

Every time the amplitude of the received pulse reaches one of the amplitude threshold levels AL1 to AL4, respective and corresponding time correction terms C1 to C4 may be applied, in effect abruptly displacing the pulse in time, as shown in FIG. 5, where the abscissa and ordinate are, respectively, pulse amplitude (V) and time (ns). The time shift terms, or time correction terms C1 to C4 may respectively correspond to the amplitude comparators AC1 to AC4. As described hereinabove, the processor 3 uses such time shifts terms for distance corrections. Exemplary values of time correction terms, noted as C1 to C4 in FIG. 3, are illustrated in FIG. 5.

Figure 6:
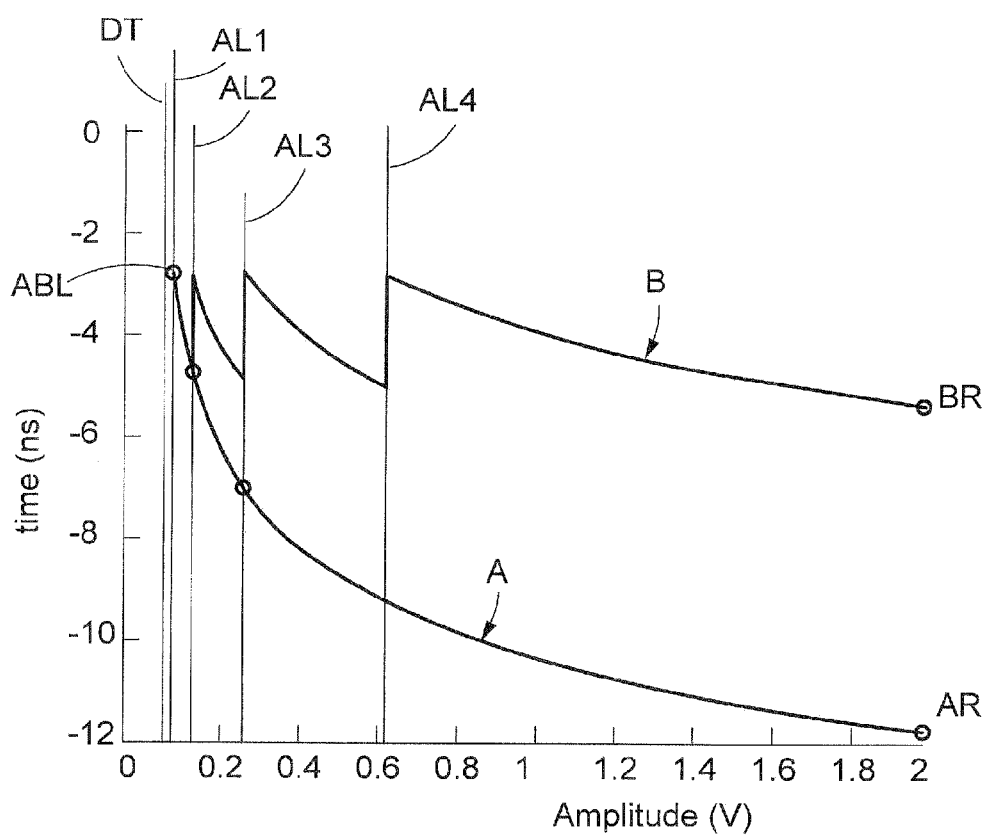

FIG. 6 is an example showing two graph lines, with the abscissa denoting pulse amplitude (volts V) and the ordinate denoting time (nanoseconds ns). The graph lines pertain to time measurement errors committed in two situations. Graph line A illustrates the first situation, when the amplitude of the returned signal is larger than the amplitude of the threshold detector DT, but is lower than the amplitude of the amplitude threshold levels AL1 to AL4. The second situation, where in addition to the threshold detection DT four more amplitude threshold levels, respectively AL1 to AL4, may trigger application of respective and corresponding time correction terms AC1 to AC4, is illustrated by graph line B. A leftmost point, shown as ABL, common to both graphs A and B, has coordinates (0.1, −3).

The ordinate difference between the leftmost and the rightmost points on each graph line indicates a time measurement error, as follows. At a rightmost extremity, graph line A ends at point AR of coordinates (2, −11.7). The time measurement error committed in the first situation is then (−3)−(−11.7)=8.7 (ns) or 1.3 m, when converted to a distance d, by using the time—distance Equation (1). On the other hand, graph B ends at the rightmost point BR of coordinates (2, −5.4). The ordinate difference, which is the time measurement error, is now only (−3)−(−5.4)=2.4 (ns) or 36 cm.

The example hereinabove illustrates the beneficial effect of the amplitude comparators AC1 to AC4. Without the amplitude comparators AC1 to AC4, a distance measurement error that may be committed in locating a point of intrusion is 1.3 m. With the amplitude comparators AC1 to AC4, the distance measurement error may be reduced to just 36 cm. The figure of 1.3 m is the distance measurement error associated with the initial distance $\epsilon_{init}$, while the figure of 36 cm is the distance measurement error associated with the corrected distance $\epsilon_{corr}$.

An intruder, such as represented by a specific point p, may be detected on the basis of a deviation of an average $d_{avr}$, of the corrected distance measurements $d_{corr}$ to the specific point p. For example, one may define an average of the distance measurements to the specific point p as average $d_{avr}$. When the average $d_{avr}$ deviates by more than, for example, a predetermined distance δ, then one may regard the deviation as an indication of intrusion. The processor 3 may then transmit an angle α to the specific point p of intrusion as well as the distance $d_{init}$, to pinpoint the intruder, for further action by authorities protecting the area 25. If desired, an alarm may be delivered.

As described hereinabove, attempts by an intruder to take advantage of walls, or of elements, or of the background of the area 25, may be thwarted. Such attempts by the intruder may include movement close to a tree or displacement by having the back sliding along a wall. Embodiments of the present invention will take advantage of enhanced reduced-error distance measurements to detect potential intruders.

Process Flow

Figure 7:
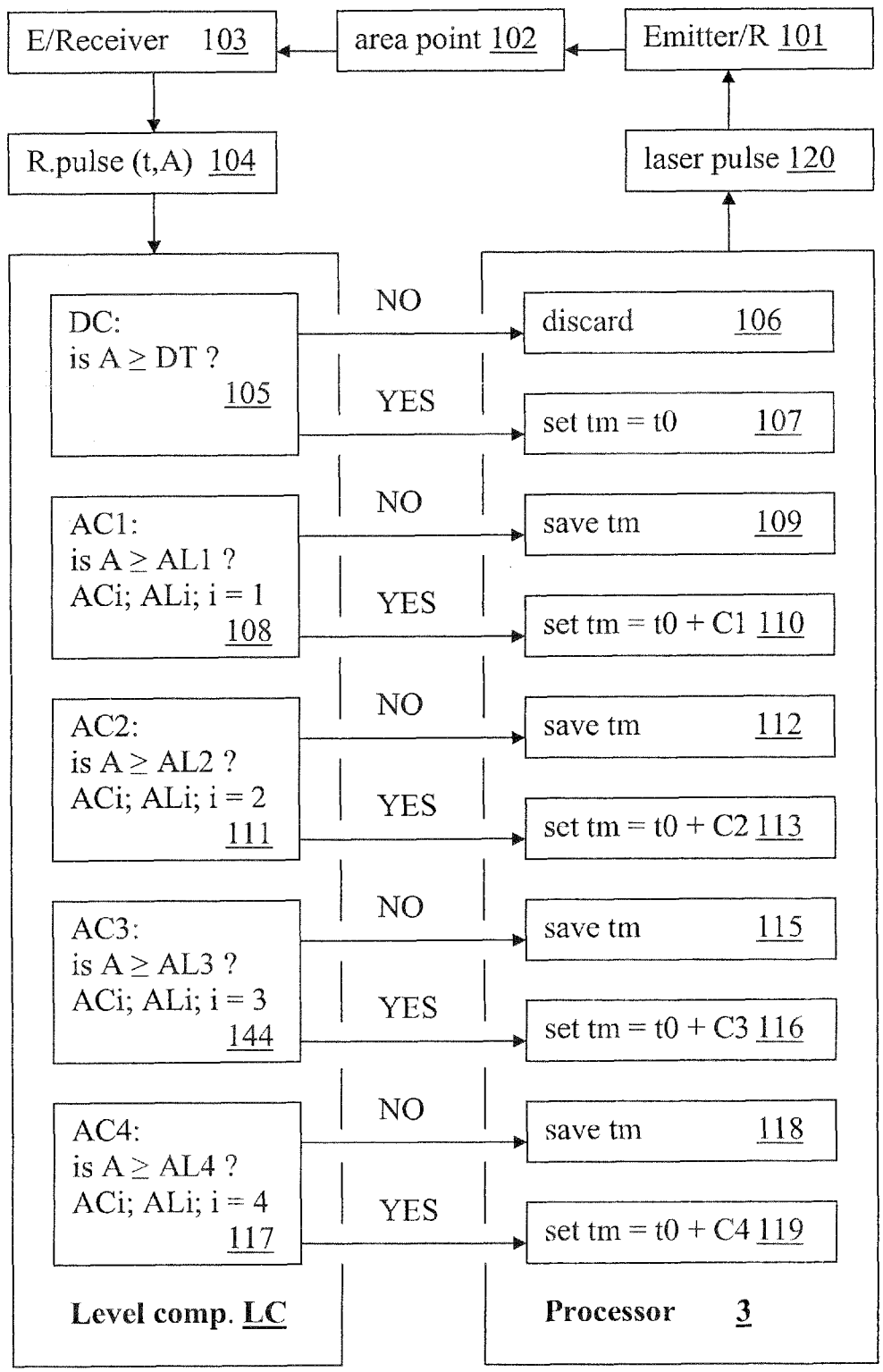
FIG. 7 is a chart showing the process of target detection.

FIG. 7 presents a simplified schematic example of the flow of the process of steps of operation of the laser range finder LRF for detection of an intruder, as controlled and commanded by the processor 3. For ease of description, reference to the angle α, which is derived by the angular encoder 5, is omitted.

In step 101, the Emitter/Receiver 1 emits a laser pulse towards the area 25, as commanded in step 120 by the processor 3. A point p of the area 25, shown by step 102, reflects the pulse to the Emitter/Receiver 1 in step 103, which reflected analog laser pulse, shown in step 104, is communicated to the block of level comparators LC.

The level comparators LC include a detection comparator DC and a number i of amplitude comparators ACi, where i is a positive integer. For example, with i=4; there are four amplitude comparators, marked in succession from AC1 to AC4. An amplitude comparator ACi with a higher index i may thus indicate comparison at a higher amplitude threshold level.

The detection comparator DC and the amplitude comparators ACi receive the reflected laser pulse simultaneously, and may operate simultaneously, but for ease of description, the level comparators may be described separately as if operating in succession. For example, one may consider four amplitude levels ALi corresponding to, respectively, four amplitude comparators ACi. The four amplitude levels ALi, may range in succession in increasing amplitude threshold level from AL1 to AL4. A higher index i appended to an amplitude level ALi may refer to a higher amplitude threshold level, measured for example in Volts. The amplitude comparison test set by the detection comparator DC has an amplitude threshold level lower than that of the lowest threshold level ALi.

In step 105, the detection comparator DC compares the amplitude A of the reflected laser pulse with a detection threshold DT. If the amplitude A is less than the detection threshold DT, then control flows to the processor 3. In turn, the processor 3 discards the value of the reflected pulse in step 106, and commands the emission of a new laser pulse in step 120. In step 101, the Emitter/Receiver 1 receives order from step 120 and follows command.

If in step 105, the amplitude A of the reflected pulse is found to equal or to exceed the detection threshold DT, then the signal is forwarded to the processor 3, to step 107 where the time t of the reflected pulse is set to the initial time, as time $t_{init}$, or $t_0$, and may be stored in the memory M, shown in FIG. 3.

As already mentioned, the angle α toward a point p in the area 25 is evidently derived together with a time value t indicative of a distance d to the target, but reference to the angle is not made hereinbelow to keep the description simple. It is understood that according to Equation (1) hereinabove, the time t or the distance d to a target are practically equivalent.

An amplitude level A higher than the detection threshold DT will be handled by the amplitude comparators ACi. In FIG. 7, with for example i=4, the amplitude comparators AC1 to AC4 are shown in, respectively, steps 108, 111, 114, and 117.

A reflected laser pulse may be received simultaneously by the amplitude comparators ACi, which are similar to each other and operate in the same manner. An amplitude comparator ACi may be associated with an amplitude level threshold ALi. However, an amplitude comparator ACi may also be associated with a plurality of amplitude level thresholds ALi, j, where j may be a function of the initial derived distance to target $d_{init}$ or where the index j refers to a specific annulus. The longer the distance $d_{init}$, the higher the amplitude level threshold ALi,j, and the greater the correction term Ci,j associated therewith.

In FIG. 7 for example, an amplitude comparator ACi may compare the amplitude A of the reflected pulse with an amplitude level threshold ALi, as shown in steps 108, 111, 114, and 117. If the amplitude A of the reflected pulse is less than the amplitude threshold level ALi, then control flow returns to the processor 3, as shown in steps 109, 112, 115, and 118. The processor 3 may save the amplitude A and the time t at which the reflected pulse is received for example by storing those values in memory M. The time of arrival $t_0$ of the returned laser pulse is saved as $t_m$ in steps 109, 112, 115, and 118, from where the processor 3 returns the flow of control to step 120, for a new laser pulse to be emitted.

However, when comparison made by the amplitude comparator ACi indicates that the amplitude A of the returned laser pulse is equal to or larger than the amplitude level ALi, then the time $t_m$ is corrected by a correction term Ci corresponding to the respective amplitude level ALi. For example, such time corrections $t_m$ are shown in FIG. 7 in steps 110, 113, 116, and 119. The corrected time $t_m$ may now be used to compute the corrected distance $d_{corr}$, according to Equation (1) hereinabove, and as shown in FIG. 3 as being an output of the processor 3.

One may also regard the amplitude level comparison process performed by the amplitude comparators ACi as being sequential. For example, the reflected laser pulse may be handled first by the highest ranked amplitude comparator, such as AC4 in FIG. 7. Should the conditions of step 117 for the amplitude level AL4 be met, then the respective corresponding correction term Ci, here C4, will be applied to time $t_0$, for control to return to step 120 for a new laser pulse to be emitted.

Otherwise, should the conditions of step 117 for the amplitude level AL4 not be met, then the previous amplitude comparator ACi, or AC3 in the present example, may handle the reflected laser pulse. Thereafter, the process may continue in descending index i order of the correction term Ci. Finally, control returns to step 120 for a new pulse to be emitted. The processor 3 may be continuously updated after every step of the process.

The processor 3 may thus be configured to selectively operate none, one, or more of the amplitude comparators ACi.

Operation

A user, not shown. May be provided with the scanning laser range finder LRF readily coupled to an input/output device and/or to a communication transceiver, last both not shown in the Figs. The laser range finder LRF is preferably disposed with a clear line of sight to the area 25 under surveillance before the start of the scanning operation. The desired field of view to be scanned may be preset in factory, or set, or adjusted by the user via the input/output device, possibly in situ.

For example, before starting surveillance operation, the laser range finder LRF may scan the area 25 in initial scan, when the area is known to be free on intruder(s). While in operation, actual scans may be compared to the initial scan, or if desired, to a selected previous scan. Differences in distance measurements to a point p in the area 25 may indicate an intrusion. Should such differences be detected between the initial scan or the selected previous scan, then alarm may be provided, via one or both of the input/output device and the communication transceiver.

It is noted that at least one correction term Ci may be applied to each one annulus ANNi of a scanned area 25. However, for i=1, different correction terms C1 may be applied to different annuli ANNi pertaining to the same scanned area 25. For example, the correction term Ci may be smaller for an annulus closer to the laser range finder LRF than for a correction term distanced farther away from the laser range finder LRF. It is thus possible to apply different at least one time correction term Ci,j for each annulus ANNi out of the plurality of annuli, where the index j refers to a specific annulus. The index j is a positive integer.

Hence, for a plurality of annuli ANNi, where at least one amplitude comparator ACi is associated with one annulus out of the plurality of annuli, the processor 3 may be configured to selectively apply at least one respectively corresponding time correction term Ci to the reflected laser pulse. The wording "selectively" refers to the ability not to apply a correction term, for example when the detection threshold DT discards or ignores the reflected pulse.

In the description hereinabove and in the claims hereinbelow, each of the verbs. "comprise" "include" and "have", and conjugates thereof, are used to indicate that the object or objects of the verb are not necessarily a complete listing of members, components, elements, or parts of the subject or subjects of the verb.

Although the present embodiments have been described to a certain degree of particularity, it should be understood that various alterations and modifications could be made without departing from the scope of the invention as hereinafter claimed.

REFERENCE SIGNS LIST

1 Emitter/Receiver
2 scanning mechanism
3 processor
4 motor
5 angular encoder
6 mirror block or mirror cube
7 housing
25 area under surveillance
100, 200 laser range finder embodiments
A amplitude
AC1 . . . AC4 amplitude comparators
A/D analog-to-digital converter
AL1 . . . AL4 or amplitude threshold levels
ANN annulus
C1 . . . C4 time correction terms, time shifts
CP computer program
DC detection comparator
DT detection threshold
$d_{init}$ initial distance
$d_{corr}$ corrected distance
$d_{avr}$ average of initial distance measurements
EX housing exterior
IN housing interior
LRF laser range finder
M memory
N number of points
p one area point
r radius
$r_l$ lower radius
$r_u$ upper radius
t time
TTVC time-to-voltage Converter
V volts
α angular position
β angle
$\epsilon_{corr}$ error associated with the corrected distance
δ distance difference
τ time interval or time-of-flight
ν scanning frequency
δ distance difference

I claim:

1. A laser range finder configured for scanning a plurality of points of a scanned area to detect an intrusion into the area, the laser range finder comprising:
   an Emitter/Receiver configured to emit laser pulses towards each point out of the plurality of points and to receive therefrom reflected laser pulses,
   a processor coupled to the Emitter/Receiver and configured to derive an initial distance separating the laser range finder away from each point, the initial distance having an initial measurement error, and
   at least one amplitude comparator which is coupled to the Emitter/Receiver and to the processor, and which is configured to derive a corrected distance to each point, the corrected distance having a corrected measurement error smaller than the initial measurement error, and
   wherein the scanned area is divided into a plurality of annuli, and the at least one amplitude comparator is associated with a corresponding one of the plurality of annuli and is configured to compare an amplitude of a reflected laser pulse to at least one respectively corresponding amplitude level, and the processor is configured to selectively apply at least one respectively corresponding time correction term to the reflected laser pulse.

2. The laser range finder according to claim 1, wherein:
   the laser range finder is housed in a housing having a housing interior and a housing exterior, and the at least one amplitude comparator is disposed in one of the housing interior and the housing exterior.

3. A laser range finder configured for scanning a plurality of points of a scanned area to detect an intrusion into the area, the laser range finder comprising:
   an Emitter/Receiver configured to emit laser pulses towards each point out of the plurality of points and to receive therefrom reflected laser pulses,
   a processor coupled to the Emitter/Receiver and configured to derive an initial distance separating the laser range finder away from each point, the initial distance having an initial measurement error, and
   at least one amplitude comparator which is coupled to the Emitter/Receiver and to the processor, and which is configured to derive a corrected distance to each point, the corrected distance having a corrected measurement error smaller than the initial measurement error,
   wherein the at least one amplitude comparator comprises four amplitude comparators configured to compare an amplitude of a reflected laser pulse to, respectively, four amplitude levels, and the processor is configured to selectively apply at least one of four time correction terms, respectively, to the reflected laser pulse, and
   wherein the scanned area is divided into a plurality of annuli, and for each annulus out of the plurality of annuli, the four amplitude comparators are configured to compare the amplitude of the reflected laser pulse to, respectively, the four corresponding amplitude levels, and the processor is configured to selectively apply at least one of the four corresponding time correction terms, respectively, to the reflected laser pulse.

4. The laser range finder according to claim 3, wherein:
   the laser range finder is housed in a housing having a housing interior and a housing exterior, and the at least one amplitude comparator is disposed in one of the housing interior and the housing exterior.

5. A laser range finder configured to scan an area to detect if an intruder has penetrated therein, and to derive an initial distance to the intruder, the laser range finder comprising:
   an Emitter/Receiver configured to emit laser pulses towards the area and to receive therefrom reflected laser pulses,
   at least one amplitude comparator coupled to the Emitter/Receiver and configured to compare an amplitude of a reflected laser pulse to at least one amplitude level, and
   a processor which is coupled to both the Emitter/Receiver and the at least one amplitude comparator, and which is configured to selectively apply at least one time correction term to the reflected laser pulse,
   wherein the scanned area is divided into a plurality of annuli, and for each annulus out of the plurality of annuli, four amplitude comparators are configured to compare the amplitude of the reflected laser pulse to, respectively, four amplitude levels, and the processor is configured to selectively apply four corresponding time correction terms, respectively, to the reflected laser pulse.

6. The laser range finder according to claim 5, wherein:
the laser pulses are reflected by a plurality of points in the scanned area, and the processor is configured to derive an initial distance separating the laser range finder away from each point out of the plurality of points, the initial distance having an initial measurement error and a corrected distance to each point, and the corrected distance having a corrected measurement error smaller than the initial measurement error.

* * * * *